United States Patent [19]

Silver

[11] Patent Number: 5,064,660
[45] Date of Patent: * Nov. 12, 1991

[54] METHOD OF MAKING ULTRA LOW-FAT CHEESE AND RESULTING PRODUCTS

[76] Inventor: Jules Silver, 7 Ridgewood Rd., Niantic, Conn. 06357

[*] Notice: The portion of the term of this patent subsequent to Dec. 18, 2007 has been disclaimed.

[21] Appl. No.: 624,622

[22] Filed: Dec. 10, 1990

Related U.S. Application Data

[63] Continuation-in-part of Ser. No. 115,767, Nov. 2, 1987, Pat. No. 4,978,553.

[51] Int. Cl.⁵ .................. A23C 20/00; A23C 19/00
[52] U.S. Cl. ............................. 426/36; 426/582; 426/657; 426/585; 426/804
[58] Field of Search ............ 426/36, 603, 582, 581, 426/656, 657, 585, 804

[56] References Cited

U.S. PATENT DOCUMENTS

| | | | |
|---|---|---|---|
| 4,568,548 | 2/1986 | Sprenger | 426/582 |
| 4,716,045 | 12/1987 | Prella | 426/582 |
| 4,724,152 | 2/1988 | Baker | 426/582 |
| 4,744,998 | 5/1988 | van Gennip et al. | 426/582 |
| 4,978,553 | 12/1990 | Silver | 426/603 |

Primary Examiner—Marianne Cintins
Attorney, Agent, or Firm—Burd, Bartz & Gutenkauf

[57] ABSTRACT

A method for the preparation of ultra low-fat cheese products. The product is prepared by plasticizing a composition containing the desired low level of lipid, preferably butterfat; an amount of protein, preferably dairy protein, sufficient to emulsify the lipid; and from about 50% to about 70% moisture. The plasticization is achieved by subjecting the composition to the high speed cutting action of a razor sharp bladed food comminuter or to ultrasonic treatment to rupture the fat globules of the lipid and to reduce the particle size of the protein matrix, for a period of time sufficient to plasticize the composition. The physical changes which take place in the protein micelles and fat globules results in protein/fat interaction forming a stable self-emulsified product without the addition of chemical stabilizers or emulsifiers.

11 Claims, No Drawings

METHOD OF MAKING ULTRA LOW-FAT CHEESE AND RESULTING PRODUCTS

This application is a continuation-in-part of application Ser. No. 115,767 filed Nov. 2, 1987, now U.S. Pat. No. 4,978,553 issued Dec. 18, 1990.

BACKGROUND OF THE INVENTION

1. Field of the Invention

This invention relates to a method for the production of ultra low-fat cheeses and and to the resultant ultra low-fat cheese products.

The method is characterized by a plasticizing step, such as high speed cutting action, or by action of ultrasound, to cause rupture of fat globules and to reduce the size of the protein matrix, creating microparticulation of the protein micelle clusters which obviates the need for added emulsifiers to stabilize fat or added stabilizers to prevent undesirable syneresis.

Cheese is one of the oldest manufactured food products known to man. It is eaten throughout the world and cheese consumption in the United States has been increasing through the years. However, this increased usage is contrary to today's recognized good health practices which recommend consuming low fat foods. Most commonly consumed cheeses contain at least 30% fat. Synthetic cheeses have been developed in an effort to reduce the fat content. However, numerous chemicals are used to substitute for the emulsifying, binding and sensory characteristics of high fat. Thus, the desire to provide more pure and chemically free foods is compromised. One might say the consumer's choice is either high fat or high chemicals.

The object of this invention is to produce a palatable and nutritious cheese product which is extremely low in fat, free from chemical emulsifiers and stabilizers, while retaining the texture, mouthfeel and flavor of conventional cheeses.

2. The Prior Art

No prior art is known which discloses or suggests the production of ultra low-fat cheese by use of a high speed cutting or similar plasticizing action to rupture fat globules and reduce most of the protein matrix to micro-particle sizes so as to eliminate the need for added chemical emulsifiers and stabilizers, while imparting the sensation of full fat products.

In my aforesaid co-pending application Ser. No. 115,767 there is disclosed a method for the production of a smooth homogeneous spreadable low-fat butter or margarine product which comprises first forming a relatively dry moisture-containing admixture of an edible protein composition and animal or vegetable fat, the admixture containing at least enough protein sufficient to emulsify the fat but less than the amount of protein which stabilizes the fat against plasticization, from about 15% to about 50% fat, and about 40% to 60% moisture. Thereafter, the admixture is plasticized by subjecting it to high speed cutting action at a temperature between about 35 degrees F. (2 degrees C.) and 100 degrees F. (38 degrees C.) to cause a rupture of the fat globule membranes. The cutting action is continued for a time from at least about 1 to 20 minutes sufficient to form a homogeneous plastic mass which is spreadable at both usual refrigerator and normal room temperature.

The present invention is based on the discovery that an ultra low-fat chemical-free cheese product can be prepared from a dairy base without the need for added chemical emulsifiers and stabilizers by subjecting the ingredients to an intense plasticizing action, such as high speed cutting action or ultrasound treatment to rupture the fat globules and reduce the protein matrix particle size.

SUMMARY OF THE INVENTION

Broadly stated, the present invention is directed to a method for the production of an ultra low-fat chemical-free cheese product which comprises first forming a relatively dry moisture-containing self-emulsifying admixture of an edible protein composition and animal or vegetable fat, the admixture containing at least enough protein sufficient to emulsify the fat. Thereafter, the admixture is subjected to an intensive plasticizing action, such as high speed cutting action, or ultrasound treatment, at a temperature between about 35 degrees F. (2 degrees C.) and 170 degrees F. (78 degrees C.) to cause a rupture of the fat globule membranes, and to reduce the size of the protein materials. For cheese production the mixture contains from about 2% to about 10% fat and about 50% to 70% moisture. The plasticization action is continued for a time from at least about 1 to 20 minutes sufficient to form a homogeneous plastic mass. The invention includes the resulting product.

DETAILED DESCRIPTION OF THE PREFERRED EMBODIMENT

The microstructure of the low-fat food product is of importance in characterizing and distinguishing the product. The high speed cutting processing procedure is one important factor which determines the texture and microstructure of the product. The microstructure in turn controls some of the physical properties such as viscosity, firmness, elasticity, susceptibility to syneresis, etc., of the product.

Protein micelles which may average 100 nm (1/10 of a micron) in size, when many are clustered together, create a protein particle mass ranging from 25 to 200 microns in size. These particle clusters are large enough to give a gritty mouthfeel to a product. The cutting procedure according to the present invention slashes, breaks and cuts apart many of the clustered protein masses into small units of clustered micelles in the size range of 3 microns or less, imparting the perception of fat.

The edible protein ingredient of the cheese product is preferably of dairy origin The dairy protein can be derived from whole milk, ultra-filtered whole or skim milk, partially defatted milk, skim milk, buttermilk, ultra-filtered buttermilk, filled milk, casein, alkali metal caseinates, cheese curd, cottage cheese, Ricotta cheese, Queso Fresco type cheeses, Baker's cheese, whey protein including whey protein concentrate (above about 25% protein) delactosed whey and demineralized whey solids, dried whey, non-fat milk solids, and the like, and mixtures thereof. The dairy protein composition can contain, in addition to dairy solids, vegetable proteins such as soy protein isolate, and fillers such as starch.

The amount of protein ranges from about 8% of the total mixture and above and is present in an amount at least sufficient to emulsify the fat or lipid, but less than about 30%. Preferably, the protein is present in the final product in amount between about 8% and 26%.

Because of lactose intolerance and graininess caused by crystallization, the lactose content of the dairy protein product used is preferably reduced below an amount that would crystallize in the final product, i.e., below about 15% by weight of the final product, and preferably to as low as possible to avoid lactose intolerance problems. If the dairy protein source is precipitated casein, e.g., cheese, the lactose is easily removed with the whey. The cheese can be made by any known process for cheese curd formation, including enzyme conversion of lactose to lactic acid or direct acidification with food grade acids, such as phosphoric or acetic acids. In order to avoid tart or acidic flavor notes from entering the product, the curding method preferably produces a sweet curd (pH of about 6-6.5) rather than an acid curd. Acid curds can be used by elevating the pH to about pH 6-6.5 with food grade base, such as sodium hydroxide.

However, products with pH 5.5 to 5.7 with excellent non-acid flavor have been made. pH adjustments can be made at the time of protein precipitation or mechanical concentration, or by blending different pH bases. Lactic acid, acetic acid, sodium hydroxide, etc., are commonly used in precipitation procedures. Concentration can be achieved by ultra-filtration, reverse osmosis and/or evaporation. Blending and cutting of a Ricotta cheese base having a pH of 6 or higher with a buttermilk concentrate having a pH of 4.5 results in an ideal product having a pH of 5.6 to 5.7. Blending bases is extremely important for modulating texture and flavor and eliminating the need to use pH adjusters, which may be required to be listed on the label of the final consumer product.

When using a dairy source other than cheese, the dairy product is blended with other materials such as edible proteins in an amount sufficient to reduce the lactose content of the dairy protein composition to the desired limit, or the lactose can be removed physically or chemically. Hydrolysis of the lactose with lactase enzyme is an effective means for essentially removing the lactose. Separation of the lactose by molecular sieve resin or ultrafiltration can also be used. These latter processes have the benefit of also removing large amounts of water, thereby concentrating the milk protein simultaneously. Thermal and/or vacuum evaporation can also be used to condense the protein, usually after delactosing.

The protein should be denatured so as not to harden in the final product. Heating to about 180 degrees F. (82 degrees C.) for at least about twenty minutes co-precipitates the whey with casein for processing. If the protein source is heated in processing, as by pasteurization, evaporation or condensing of milk, or by heating a cheese curd, further denaturing is not necessary.

Fat is added to the protein composition to the desired fat content of the final product. For cheese, fat content is about 2 to 10 percent of the total weight. Fat content is based on solvent soluble lipid. Milk containing varying amounts of fat is an effective starting material. The fat content of the milk can be augmented by the addition of other sources of butter fat such as from butter oil, butter, high fat cream or plastic cream, either singly or in combination.

The composition prior to processing has a moisture content ranging from about 70% and below so as to form a relatively dry product. Preferably, the moisture content for cheese ranges from about 50% to about 70% by weight. The higher moisture cheese products are used as spreads. The lower moisture products are formed into bricks or other shapes. In the case of dry ingredients, the moisture can be added as water. Moisture can also be added as part of the ingredients, such as by the use of milk. In using protein-containing sources having a large amount of water, such as milk or cheese, it may be necessary to blend the protein with sufficient dry ingredients, or remove sufficient water by ultrafiltration or dehydration to achieve the desired moisture level.

The blended mixture is converted into a homogeneous plastic mass upon plastization, such as severe cutting, or ultrasound treatment, as described in detail hereinafter. The addition of moisture, where needed, occurs during blending prior to cutting, or the blending and cutting can occur simultaneously.

Salt may be included in the final composition in an amount sufficient for flavoring, e.g., up to about 2.5%. Other commercially available cheese flavorings, cheese culture, and colorings can also be added, such as natural cheese flavoring, carotene for coloring, and the like. For textured cheeses, natural cheese crumbles and chunks may be added up to 10% to 15%, after plasticization.

After thorough blending of the components of the composition of the invention, the composition is plasticized, as by subjecting the composition to the cutting action of a device which can rupture the fat globule membrane of the lipid component of the material. High speed cutting of the fat globules causes a tearing and ripping of the fat globule membrane from the fat cell wall and spreading out of the contained fat. This allows the naturally occuring diglycerides, lipoproteins, phospholipids to act as stabilizing agents. At the same time, as observed by electron microscopy, the protein matrix is altered by the severe cutting process, rendering the clusters of casein very fluffy instead of the usual compact form. The fluffy particles consist of casein micelle chains and clusters. The size of the fat globules is generally about 5 to 10 microns. Many of the protein particles are microparticulated being reduced to 3 microns and below, and most are smaller than 10 microns. Those clusters of casein which are compact and agglomerated are loosened to a fluffy state and reduced in size to that of the smaller fat globules which thus gives the perception of fat. In the case of cheese, this action results in the emulsification of the protein mass, with extremely little fat, yet creating the sensory perception of a high fat product. The cheese products are desireably heated after cutting, in a jacketed vessel at a temperature between about 165 degrees F. (74 degrees C.) to 200 degrees F. (93 degrees C.), preferably about 185 degrees F. (85 degrees C.) for about 3 to 5 minutes before the product is packaged.

The reduced casein micelles, alpha-lactoalbumin and beta-lactoglobulin are believed to bind to the milk fat at the interface of the milk fat and protein. The action causes formation of a stable oil in protein and water emulsion. The cutting or slicing of the fat globule increases the surface areas of the fat particles giving more surface area for the reduced protein to react with and bind to. This protein-fat interaction forms a remarkably stable emulsion without the addition of stabilizers or emulsifiers.

The proteins, casein, alpha-lactoalbumin and beta-lactoglobulin have water binding ability which enables them to bind the free water that is in the low fat emulsion. The proteins also have an affinity for the fat globule if there is no emulsifier added to the system, adding to the stability of the emulsion. Emulsifiers tend to destabilize the fat globule and reduce the binding of milk protein to the fat. The uniqueness of the present invention is the high speed cutting or ultrasound reduction of the proteins resulting in protein microparticulation and lipid tearing increasing the surface area and causing greater interaction between the two phases of reduced protein and lipid without the use of added chemical emulsifiers and stabilizers.

The cutting action is carried out in commercially available processing equipment fitted with razor sharp cutting blades adapted for high speed rotation. The blades preferably have serrated edges. Ertel, Stephan and Hobart high speed food processors are exemplary of available equipment which may be used. The processing step is conducted for a period of time sufficient to convert the substantially low moisture blend of protein and lipid to a smooth plastic pourable or spreadable mass. Cutting times depend on the type of equipment used, the speed of the cutting blade, the efficiency of the cutting action and the amount of material processed. Batch style food processors equipped with arcuate sigmoid or S-shaped blades arrayed for rotation in a horizontal plane and spaced apart vertically have been used successfully. Usual rotation speeds are from about 2000 to 7000 RPM and the protein-fat mixture has been subjected to cutting action for at least about 1 to 20 minutes and preferably 10 to 15 minutes in one or two stages.

Commercially available high capacity food comminuting machines utilizing vertically arrayed blades are designed for rotation at speeds up to 13500 RPM. At such higher speeds residence times may be lower, at least about 1 to 5 minutes. COMITROL comminuting machines sold by Urschel Laboratories Incorporated of Valpariso, Ind. are exemplary. When utilized in the manner described, equipment of Stephan Food Processors, Columbus, Ohio, produces the desired plasticization. Exemplary ultrasonic treatment equipment includes that sold by Sonic Pump Co., of Stamford, Conn., in which material is forced through an ultrasonic zone by means of a high pressure pump.

Homogenization is a treatment by which fat globules of milk are uniformly dispersed throughout the milk to prevent separation of the lighter cream upon standing. Homogenization is a relatively more gentle treatment of the fat globules than the cutting action of the present invention and does not result in tearing and ripping of the fat globule membrane, nor disruption of the protein matrix.

The product may be packaged in the same manner and using the same equipment as conventional cheeses and cheese spreads.

The invention is illustrated in the examples which follow. As used herein, all percentages are by weight based on the total weight of the final composition unless otherwise stated.

EXAMPLE 1

A 3% fat cream cheese product is prepared by introducing 260 parts by weight of skim milk cottage cheese moisture reduced to 40% moisture, 47 parts buttermilk ultrafiltrated and moisture reduced to 45% moisture, 30 parts cultured buttermilk solids (San Buttermilk Powder #983—Beatreme Foods, Inc.) and 1.6 parts salt to a Stephan processor and cutting at 3500-5000 RPM for at least 10 minutes, until the dense mass became thickly fluid. Ten parts of Microguard (a skim milk fermented product having bacteriostatic properties) was added and the mass is cut again at 3500-5000 RPM for an additional 5 minutes. The entire mass is then heated in a jacketed vessel to between 165 degrees F. to 200 degrees F. for 3 to 5 minutes, after which the cream cheese product is packed, sealed and placed under refrigeration.

EXAMPLE 2

Normally Bleu cheese contains about 30% fat.

A 6% Bleu cheese product having the following composition was prepared according to the method of Example 1:
- 300 parts skim milk cottage cheese
- 30 parts San A Cultured Buttermilk Powder #393 (Beatreme Foods)
- 38 parts Bleu Cheese Powder
- 34 parts Fresh Bleu Cheese crumbles
- 10 parts Microguard
- 5 parts Cream Extract Powder
- 1.6 parts Salt The Microguard and Cream Extract were added after 10 minutes and the mass was cut for a further 5 minutes. The fresh Bleu cheese crumbles were added and cut for 2 to 3 seconds to permit the product to have a textured character. A typical 6% Bleu cheese made according to this method contains only about 48 calories per ounce, less than half of the calories in regular Bleu cheese, and about 6 mg cholesterol, less than one-fourth as much cholesterol as in regular Bleu cheese.

EXAMPLE 3

A 5% fat Gorgonzola cheese product may be prepared according to the method of Example 1 from the following ingredients:
- 300 parts 60% skim milk cottage cheese or the equivalent
- 10 parts San Buttermilk Powder #983
- 15 parts Natural Bleu Cheese flavoring
- 42 parts Natural Gorgonzola cheese crumbles
- 5 parts Whey protein concentrate (Calpro #7502)

The crumbles are added at the end of processing and cut only for 2 to 3 seconds to permit the finished product to have a textured character.

EXAMPLE 4

In the same manner a Bleu cheese product having 7% fat is prepared from the following ingredients:
- 300 parts Bakers Cheese—62% moisture
- 30 parts Natural flavor concentrate Bleu
- 13 parts Butter
- 38 parts Bleu cheese chunks (natural)
- 1 part Microguard concentrate

EXAMPLE 5

A Cheddar cheese product having 6% fat is prepared according to the method of Example 1 from the following ingredients:
- 300 parts Bakers cheese—62% moisture
- 40 parts Cheddar natural flavor concentrate
- 10 parts Whey protein (whole liquid)
- 6 parts Gelatin—125 bloom
- 15 parts Butter
- 15 parts Cultured Buttermilk Powder Regular Cheddar cheese contains about 32% fat and about 110 calories and about 30 mg cholesterol per ounce. A popular "lite" Cheddar contains about 18% fat and about 90 calories and about 20 mg cholesterol per ounce. In sharp contrast a 6% Cheddar according to the present method contains only about 48 calories and about 6 mg cholesterol per ounce.

EXAMPLE 6

A Bleu cheese product having 9% fat is prepared according to the method of Example 1 from the following ingredients:
- 300 parts ultrafiltered buttermilk—70% moisture
- 30 parts natural Bleu concentrate flavor
- 30 parts natural Bleu cheese chunks
- 1 part Microguard

EXAMPLE 7

A Cheddar cheese product having a fat content of 8% is prepared according to the method of Example 1 using the following ingredients:
- 300 parts untrafiltered Buttermilk—70% moisture
- 35 parts natural Cheddar flavor concentrate
- 20 parts dried ultrafiltered Buttermilk Powder
- 3 parts Gelatine The process of the invention creates a physical change in the cheese product that results in the physical alteration of the microscopic elements within the mass by size reduction, rearrangement and alteration of the protein micelles and fat globules resulting in a product with a greatly improved character without the use of additives and/or chemicals. The cheeses are 80% lower in fat than regular cheeses available today.

It is apparent that many modifications and variations of this invention as hereinbefore set forth may be made without departing from the spirit and scope thereof. The specific embodiments described are given by way of example only. The invention is limited only by the terms of the appended claims.

I claim:

1. A method for the production of an ultra low-fat cheese food product which comprises:
   A) forming a relatively dry moisture containing admixture of an edible protein and fat, said admixture containing at least enough protein sufficient to emulsify the fat, a low level of 2 to 10% fat corresponding to that desired in the finished product, and about 50% to 70% moisture; and
   B) plasticizing said admixture to cause a rupture of the fat globule membranes and to reduce the particle size of the protein matrix to form a homogeneous self-emulsifying plastic cheese food mass.

2. A method according to claim 1 wherein said admixture is plasticized by subjecting to high speed sharp blade cutting action.

3. A method according to claim 2 wherein the admixture is subjected to a high speed cutting action at between about 2000 and 7000 RPM for about 1 to 20 minutes.

4. A method according to claim 1 wherein said protein is a dairy-based composition.

5. A method according to claim 4 wherein said fat and protein is derived at least in part from ultrafiltered milk or skim milk or ultrafiltered buttermilk.

6. A method according to claim 1 wherein said fat is butterfat.

7. A method according to claim 1 wherein natural cheese chunks or crumbles are added to the homogeneous cheese food mass and rough-cut for about 2 to 3 seconds to uniformly distribute the chunks or crumbles.

8. A method according to claim 1 wherein said plasticized cheese product is heated to between about 74 degrees C. to about 93 degrees C. for about 3 to 5 minutes and thereafter packaged.

9. An ultra low-fat cheese product made according to the method of claim 1.

10. An ultra low-fat cheese food product which comprises a relatively dry moisture-containing admixture of an edible protein composition and animal or vegetable fat, said admixture containing at least enough protein to maintain the fat dispersed in a uniform homogeneous emulsion, 2 to 10% fat, and about 50% to 70% moisture, said fat being characterized by rupture of the fat globule membranes and spreading out of the fat from the fat globules and said protein being characterized by reduction of the protein matrix particles to a size less than the fat globules.

11. An ultra low-fat cheese product according to claim 10 wherein the product includes comminuted natural cheese particles uniformly distributed.

* * * * *